Jan. 20, 1970 F. McCORMICK 3,491,023
PROCESS FOR CONTAINMENT AND DEFLECTION OF AQUEOUS SURFACE POLLUTANTS
Filed Dec. 1, 1967
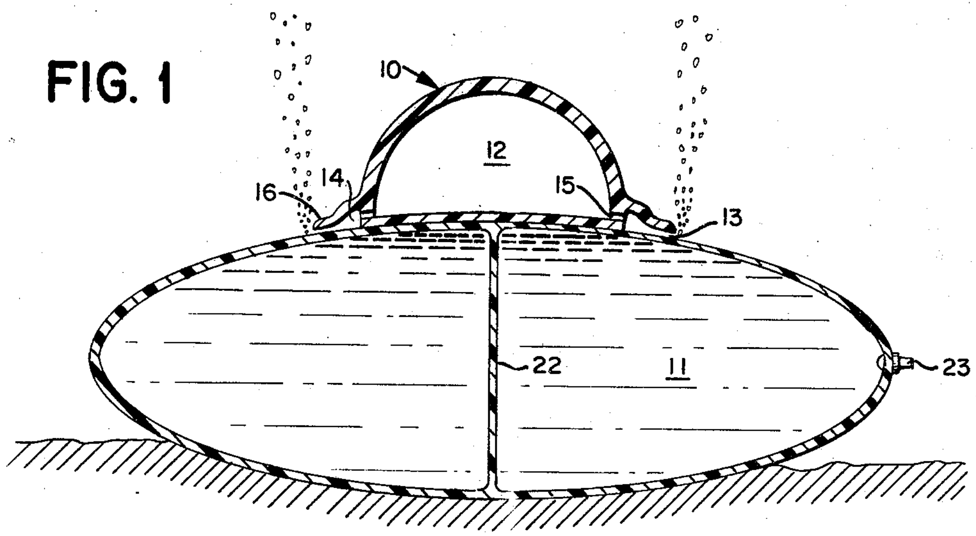
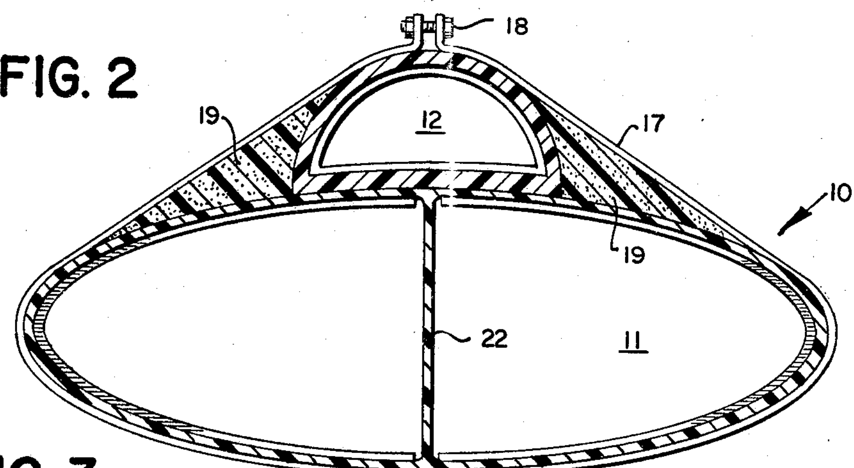
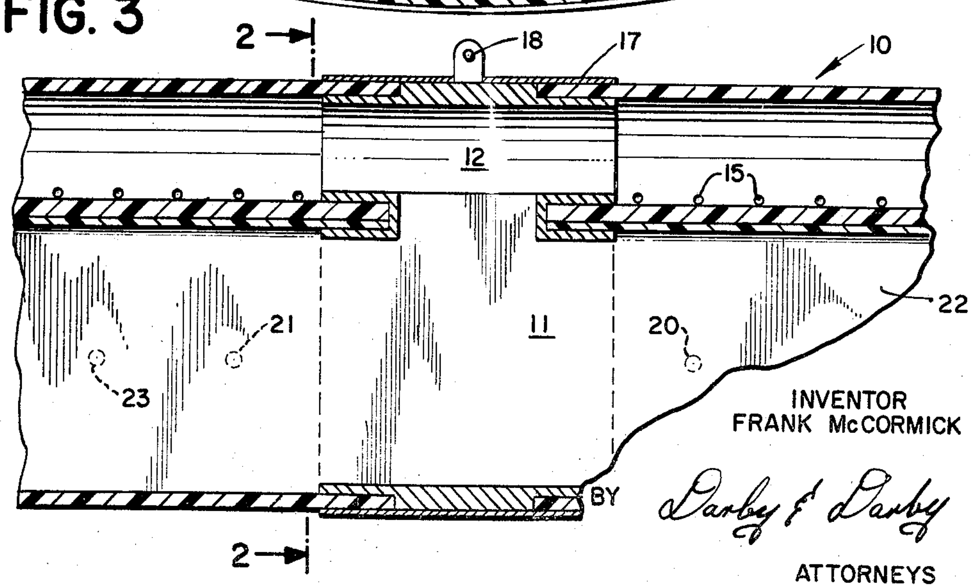
INVENTOR
FRANK McCORMICK
BY Darby & Darby
ATTORNEYS United States Patent Office 3,491,023
Patented Jan. 20, 1970

1

3,491,023

PROCESS FOR CONTAINMENT AND DEFLECTION OF AQUEOUS SURFACE POLLUTANTS

Frank McCormick, Stamford, Conn., assignor to Submersible Systems, Inc., Stamford, Conn., a corporation of Connecticut Filed Dec. 1, 1967, Ser. No. 687,349
Int. Cl. B01d *35/02, 23/00*
U.S. Cl. 210—83 10 Claims

ABSTRACT OF THE DISCLOSURE

A method for containment and deflection of inorganic and organic aqueous surface pollutants such as an oil slick, flotsam, debris and jellyfish and apparatus for the operation of such method are disclosed. This method comprises the generation of an air or bubble barrier which permits the passage therethrough of surface vessels and large fish but halts the movement of floating surface pollutants by the creation of a flexible continuous band of surface turbulence. The system in one specific application is designed to protect harbor and beach areas and fishing grounds from contamination with oil from oil tankers and also acts as an "air wall" to keep harmful jellyfish from beach areas. The system can also be employed to recover oil from sunken or leaking tankers at sea by containment and collection of the oil released therefrom within the circumference of the bubble barrier wall created in a geometric pattern about the location of the stricken vessel.

BACKGROUND OF THE INVENTION

At the present time a serious and ever increasing problem has arisen with respect to pollution of ocean beaches, harbors, marinas, lakes, rivers and such due to surface contamination of the water with oil and other floating debris. A very serious related problem exists in areas such as Chesapeake Bay, and sea beaches such as the Florida beaches due to the invasion and contamination of the beach areas with jellyfish, or as they are also referred to, "Portuguese Man-of-War." These two surface contaminants alone cause millions of dollars of damage each year to the land areas which are contiguous to the surface polluted water.

A more recent threat in this connection is currently arising and promises to create a disaster situation unless the means to contain it are found. Specifically, during World War II a very large number of oil tankers transporting large quantities of crude oil were torpedoed and sunk off the coastal waterways of the United States. Most of these sunken vessels still retain millions of tons of crude oil in intact compartments and tanks of the sunken vessels. During the ensuing years since the war the metal plates of these tankers have been slowly oxidizing and rusting away and some are beginning to leak oil. At present, the location of these sunken vessels is known but due to sea conditions and depths at which the vessels are sunk it is not feasible to drain these tanks by normal salvage operations. The consequences of rupture of one of these tankers and such an uncontrolled release of crude oil carried by ocean currents to coastal beaches and waterways has been painfully demonstrated by the recent breakup of the oil tanker Torrey Canyon and the consequent inestimable damage to the coastline of Great Britain and France.

While the use of air bubbles has been contemplated for aeration of sewage tanks to increase microbial degradation of the sewage as suggested by such prior art patents as No. 1,936,305 granted in 1933, No. 3,153,682 granted in 1964 and No. 3,294,380 granted in 1966, none

2 of the prior art has done more than oxygen-enrich a body of water in a confined area by the random infusion of air bubbles. While praiseworthy, these disclosures do not appreciate the substance of applicant's inventive contribution which is addressed to the creation and maintenance of a geometrically defined air bubble barrier means of confinement and deflection of surface pollutants, especially oil.

It is a specific advantage of the present invention to provide a fluid air barrier means which permits fish and surface boats to easily pass into and out of marinas, harbors and beach areas while keeping out jellyfish and oleagenous water pollutants.

It is a specific object to provide a means for surface confinement of oily surface materials to a restricted geometric area and thus to permit collection of said oil for separation and recovery from sea or lake water.

It is a specific object also to provide a nonfouling air or bubble barrier generating system which is quickly and easily laid in any desired geometric pattern either on the sea bottom in harbors and shallow water or suspended from spaced floats or buoys where deep sea oil salvage is involved.

It is still a further specific object to provide a means for storage of crude oil water ballast in offshore basins for reuse by oil tankers or for separation of the crude oil from the sea water.

It is a general object to provide an improved means of aeration of water to improve the aquatic environment, deice the water, and reduce water pollution therein.

THE INVENTION

The present invention therefore provides a method and means for diminishing the pollution of bodies of water. It particularly presents a method of creating and maintaining a flexible air-bubble barrier or shield which will not permit the passage therethrough of oily surface wastes or floating objects such as jellyfish or solid debris, yet will permit the passage of surface craft and fish. The system is essentially based on the discovery that oil or jellyfish are deflected from passage through a band of turbulence created by underwater generation of air from a series of longitudinally arranged gaseous generators. When so concentrated a bubble barrier, so to speak, is created which by the upward movement of the air bubbles creates an upwardly and outwardly moving water current in the nature of a welling effect on either side of this wall. As a result, any floating pollutant approaching such a barrier is forced and deflected away from the barrier. Some of the many specific applications of this principle will be explained hereinbelow.

The air generating system which generates this bubble wall is composed of a system of flexible compartmented plastic conduits. These conduits may be laid across the mouth of a harbor or along a beach area by being fed from a reel positioned on a vessel in a manner similar to that employed in laying undersea communication cable. The main compartment of this gaseous bubble generator system is a ballast chamber and designed to be flooded with a high density fluid, which fluid may if desired contain various chemicals to retard the growth of underwater organisms. At a given time when this compartment is flooded the system acquires a negative ballast and sinks to the floor of the ocean, where it remains until activated for use. Superimposed on this ballast chamber is a much smaller compartment or conduit for the passage of gases such as air or mixtures of air with such gases as $P_2O_5$ or chlorine gas. This latter conduit in cross-section gives the appearance of a bell superimposed and joined to the lower ballast compartment. At spaced intervals along the outer periphery of this gaseous conduit there are numerous lateral ducts having apertures which open at one end into the interior of the bell-shaped air passage and at the other end into a small air lock. This air lock will maintain regardless of whether or not the air pressure is maintained in the system. As long as this is the case it is of course obvious that with such an arrangement no algae or sea water carrying the same can come into contact with either the aperture or the main channel.

When ready for activation of the system the air compressor is turned on and the gas generation commenced. A wicket-like device is placed along the line at selected intervals to insure against a movement of the structure from its assigned position on the sea bed.

For the accomplishment of the invention the following description of one form of novel air bubble wall generating system is shown in the annexed drawing which sets forth in detail one illustrative embodiment thereof. It is of course to be understood that this is only one of the various means by which the process of the present invention may be carried out.

In the drawing:

FIG. 1 is a cross-sectional view taken through the middle of a section of the gaseous generator conduit and ballast compartment.

FIG. 2 is also a cross-sectional view taken through a coupling segment designed to tie together two sections as in FIG. 3. The view is along the plane indicated as 2—2.

FIG. 3 is an enlarged lengthwise sectional view through the medium plane of two sections of the system which includes the coupling segment as well.

Referring to FIGS. 1 through 3, the present invention is illustrated by reference to the novel gas generating system which supplies the air bubble blast to construct the "bubble barrier." This device consists of a series of flexible sections of a heavy density plastic housing 10 which is manufactured by extrusion molding in various lengths. This housing has at least two separate compartments 11 and 12 in each unit or module. The entire housing is constructed of a heavy duty water resistant plastic such as polyvinyl chloride or a 50/50 blend of polystyrene-butadiene rubber and polyvinyl chloride.

The lower portion of this housing 10 may take many shapes but for purposes of illustration is shown as elliptical (which form has demonstrated excellent stability) and comprises a negative ballast chamber 11 when the modules of the system are to be sunk to the ocean floor is filled with water. The upper portion of the housing comprises an air chamber 12 for conveyance of gaseous material under pressure normally about 30 p.s.i. and a series of laterally extending air ducts 15 which open into an air lock 14 by means of 1/16" diameter aperture 13. The air lock 14 is protected by a heavy shoulder flap valve 16.

The series of modules which comprise the system function together to create a metered quantity of surface turbulence, which area of turbulence can be precisely positioned by the relative position of the housing on the ocean floor. The width of the "bubble barrier" can be controlled by the volume of gas released by each aperture to create a void-free barrier.

A specific feature of the present system is its freedom from fouling and contamination with algae and other underwater growths which are prevented from entering the system due to the arrangement of the air lock 14 which protects the aperture 13 and lateral air duct 15 from contact with the sea water. This is true even if the air compressor fails because the air lock will always maintain a constant air barrier until the pumping is resumed due to water pressure on the shoulder flap transmitted to the valve seat 16 thus sealing off the air lock from the surrounding water.

A definite advantage of the present "bubble wall" generating system as described above is its ease of handling for repair and/or inspection when and if such becomes necessary. In the event of the need to bring a section of the generating system to the surface, a diver descends, puts a block in one end of the section to be raised, opens water outlet 21, ties an air hose on air pressure valve 20 and blows out the water from the negative ballast chamber 11. As a result of this the entire section floats to the surface where it can be pulled aboard for inspection or repair. To be replaced the reverse of this operation takes place.

In operation the entire system is initially placed in position by reeling off the flexible housing in deflated form from the deck of a vessel. The system where installed over a long distance is usually laid in 1,000 foot lengths connected by locking couplers or clamps which can be disengaged and the sections separated when desired. In any event, once the sections have been connected and laid out on the water behind the vessel, they are flooded and sunk into position. The air pumps are turned on and the system is in operation.

The system will be employed somewhat differently when used to contain oil from a leaking oil tanker at sea or when employed in deep water (depths of 250 feet or more) salvage of oil from a sunken tanker. In this event the system will be suspended from surface floats or buoys at distances of about 8 to 10 feet below the surface before activation.

In the use of the system in deep sea salvage of oil it may be required because of underwater ocean currents to employ another feature of my device. More specifically, the normal operation of the equipment will involve arrangement of the bubble line in an approximate circle or geometric arrangement so as to completely surround the oil source. However, in some instances due to underwater currents despite the surface buoys and sea anchors, these currents will tend to collapse the circle. In this event a water pump is activated aboard the salvage vessel or tender and lateral water jets 23 positioned at distances of every three or four feet along the line are opened, causing a flow of water along the inner wall of ballast chamber partition 22 and out of lateral water jets 23. The force of this water flow tends to offset and counterbalance any underwater current and keep the housing 10 in substantially a circle, thus maintaining the bubble barrier wall in its proper geometric configuration.

It is of course to be recognized that when long distances of the system are to be stretched out along either a beach or marina area or at sea in the above salvage operations, auxiliary air lines from pumps or air generators spaced at given distances along the system will be employed to maintain the air pressure in the system substantially uniform. In this regard it has been found that at depths of about three or four feet of water the maximum distance apart at which the air apertures should be located is about two feet. At greater water depths the spacing between the air apertures may be increased because the air bubbles as they rise over a greater depth of water tend to spread out and maintain a broader interlocking zone of surface turbulence. The only real criterion for this structural arrangement is that the zone of surface turbulence created must not have any gaps therein but must be entirely continuous, since any openings therein will create in fact a series of eddy currents working in the form of a vortex or funnel which in fact will draw the surface pollutants through the barrier rather than directing them away from the barrier.

The following examples will serve to illustrate several applications of the novel process and the use of my new bubble barrier generating equipment.

EXAMPLE 1

Method of salvage of oil from a damaged barge

A stricken barge or tanker which has run aground in relatively shallow water (10 to 30 feet deep) and is leaking oil from its damaged tanks will first be completely surrounded by a circular pattern of my submersible air barrier conduit. This conduit is fed from a reel on the aft portion of the salvage vessel and positioned so as to be later suspended approximately 20 feet below the surface of the water by expanded polyurethane floats located approximately every 10–20 feet apart on the periphery of a circle having a mean diameter of 2,500 feet and a circumference of 7,850 feet.

Once the geometric pattern is established, the salvage vessel which is equipped with both water pumps and air compressors (1,200 c.f.m. volume) would be attached to one end of the system and activated. Upon activation the water pump would first cause flooding of the ballast chamber, shown in FIG. 1 of the annexed drawing, and the entire system would sink to the 20 foot depth where it would be held suspended from the aforesaid floats in the approximate circular configuration.

Upon activation of the air compressor the air enters the line and the various locks at an average line pressure of about 30 p.s.i. over its entire distance. As the air creates a line pressure in air chamber 12 it pushes out of a series of 1/16 to 1/4 inch diameter apertures 13 which it enters from lateral air ducts 15, also shown in the annexed drawing. These air ducts are protected from fouling by air lock 14 and flap valve 16 in case the air pressure should suddenly fail. The apertures are spaced about 28 inches apart and as the air bubble columns generated ascend to the surface of the water they create a zone of surface turbulence about 3 to 4 feet wide and extending in such a geometric pattern as to form a ring of surface turbulence and subsurface eddy currents about the stricken vessel.

Gradually the oil fills the circular area and is more strictly confined and deepened in the pool or reservoir created by a shrinking of the circle to a diameter of 1,500 feet. At this point a pumping vessel which is normally an undamaged oil barge is brought alongside the pool and pulls off or decants the surface oil and some entrained water into its empty tanks to effect removal therefrom.

Hence the oil is recovered from the stricken vessel and pollution of surrounding areas prevented.

EXAMPLE 2

Salvage of oil from a sunken tanker

The above general technique would in general be applied except that in this case the vessel is located below present salvage depth, i.e., about 300 feet or more beneath the surface.

In this instance the specific vessel is located by sonar fathometer and a submersible type bubble barrier placed in a circle of about two miles diameter about the position of the sunken vessel. Depth charges are then dropped to crack the hull of the vessel and induce the oil to pour from the tanker and float to the surface within the confines of the bubble barrier wall. As in the previous example, the oil is then contained in the artificially created reservoir formed by the circular barrier of air bubbles. The oil is then removed by suction lines or surface skimmers into a standby tanker which pumps it out of the reservoir at a point where the oil layer becomes a few inches thick on the surface of the water within the circular area.

In some instances of deep sea salvage of this type it becomes necessary to employ the lateral water jets 23 shown in the annexed drawing, which jets draw water from the inner ballast chamber which contains circulating water and is separated from the non-circulating water ballast by ballast chamber partition 22.

Upon completion of the salvage operation the air pressure is shut down and the air pressure compressors hooked into the water ballast system to blow the water ballast out of the device and cause the plastic housing 10 to rise to the surface, where it is reeled in again and is ready for reuse at another location.

From the foregoing description it can easily be seen that my bubble barrier can be quite useful in controlling and repelling oil slicks invading beaches, marinas, resort areas and fishing grounds. The submersible air barrier system can be used in lengths of from 500 feet to ten miles or more as the need dictates. In some areas it can be used to tow or herd an oil slick out of a given area to an area where it can be recovered or disposed of. While oil has been noted as the surface pollutant in the several examples, it becomes of course quite obvious that the troublesome jellyfish which constantly invade resort beach areas can be kept out of these areas easily and cheaply with a "fence" which does not need to be frequently mended and which permits passage therethrough of fish and small boats while guarding against the entrance of jellyfish or other harmful sea animals which are referred to herein as surface water pollutants.

A useful feature of the air generating system of my invention resides in the fact that sections can be linked together or disconnected by mere insertion of a coupler 19 which is comprised of a plastic housing as described in FIG. 3 of the drawing, a clamp 17 and a clamp fastener 18, all of which are utilized to tie together the various sections of the system and hence render it a continuous conduit. In those instances where a problem of attachment of the fastener exists a filler block may be supplied to make the attachment of the fastener more readily tenable.

What is claimed is:

1. A process for the containment and deflection of aqueous surface pollutants which comprises:

(a) constant generation of a gas from an underwater conduit in a planned geometric pattern to form a corresponding prearranged continuous band of turbulence on the surface of the water, which band of turbulence corresponds to the underwater positioning of the gaseous conduit, (b) creating and maintaining an upward and outward moving vertical eddy current on either side of said band of turbulence to cause welling away therefrom of any solid or liquid matter floating on said aqueous surface, which matter is consequently contained in a given area or deflected in a given direction.

2. A process for the containment and reclamation of oil from a floating or sunken tanker which comprises:

(a) positioning in the water in a substantially geometric circular pattern a continuous flexible air bubble barrier derived from continuous release of air from a gaseous generating conduit sunken to a moderate depth below the surface of the water, (b) releasing the oil from the tanker and causing it to rise within the area circumscribed by the continuous air bubble barrier, (c) reducing the circumference of the said air bubble barrier to cause a concentration and deepening of the surface oil layer entrapped therein, which oil surface layer thickens within a given area of circle to form a reservoir of oil therein, (d) removing from this reservoir the concentrated oil water emulsion into a standby vessel for separation and recovery of the oil.

3. A process according to claim 1 wherein the aqueous surface pollutant is oil.

4. A process according to claim 1 wherein the aqueous surface pollutant is jellyfish.

5. A process according to claim 1 wherein the gas generated is air.

6. A process according to claim 4 wherein the gas generated is air.

7. A system for continuous generation of a continuous band of water surface turbulence which defines an air bubble barrier which comprises:

(a) a means containing a fluid for maintaining a negative ballast in a partially flexible multicompartmented conduit having a negative ballast chamber capable of being filled and emptied with water when the conduit is to be either sunken or elevated in the water;

(b) a means for conducting a gaseous fluid under pressure through the said conduit, said means having at least one central air chamber, and uniformly spaced lateral apertures therein which constantly aerate, superimposed on the ballast chamber and running parallel to it, said air chamber being connected to an air pump; and (c) a means for dispensing said air continuously from the conduit into the water surrounding same by means of a series of uniformly spaced lateral air ducts running at right angles from the central air chamber into a cavity having air outlets by means of apertures spaced uniformly apart.

8. A process for the containment and deflection of solid or liquid pollutants at or near the surface of an open body of water which comprises introducing into the water a constant flow of gas bubbles from a conduit positioned beneath the surface of the body of water, said conduit having a series of uniformly spaced apertures positioned at preselected points along the conduit at a constant depth for the introduction of said gas into said body of water, said apertures positioned so as to create by the gas bubbles issuing therefrom, a continuous band of turbulence on the surface of the water, said band of turbulence substantially corresponding to the linear position of the said conduit, said gas, upon being introduced into said body of water, thereby creating a corresponding continuous upward and outward moving vertical eddy current in the water on either side of said band of surface turbulence to cause welling of pollutants floating in or near the surface of the body of water away from the said band of turbulence.

9. A process according to claim 8 wherein the apertures are positioned at a maximum uniform distance of 24 inches when the conduit is submerged a distance of 36 inches below the surface of the water.

10. A process according to claim 8 wherein the gas bubbles introduced are air bubbles and the apertures in the conduit are positioned at a maximum uniform distance of 28 inches apart when the conduit is submerged a constant depth of 20 feet below the surface of the water.

References Cited

UNITED STATES PATENTS

| | | | |
|---|---|---|---|
| 3,068,655 | 12/1962 | Murray et al. | 61—6 |
| 3,184,923 | 5/1965 | Galvaing | 210—242 X |
| 3,293,861 | 12/1966 | Hinde | 61—1 |
| 3,318,098 | 5/1967 | Hoddinott et al. | 61—1 |
| 3,369,664 | 2/1968 | Dahan | 210—83 |

REUBEN FRIEDMAN, Primary Examiner

J. W. ADEE, Assistant Examiner

U.S. Cl. X.R.

61—1, 6; 210—170, 242